(12) United States Patent
Zhang et al.

(10) Patent No.: US 6,801,010 B2
(45) Date of Patent: Oct. 5, 2004

(54) VIBRATION SUPPRESSION POSITIONING CONTROLLER

(75) Inventors: Wennong Zhang, Fukuoka (JP); Yasuhiko Kaku, Fukuoka (JP); Tadashi Okubo, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/467,086

(22) PCT Filed: Jan. 24, 2002

(86) PCT No.: PCT/JP02/00531

§ 371 (c)(1),
(2), (4) Date: Aug. 5, 2003

(87) PCT Pub. No.: WO02/063401

PCT Pub. Date: Aug. 15, 2002

(65) Prior Publication Data

US 2004/0061609 A1 Apr. 1, 2004

(30) Foreign Application Priority Data

Feb. 7, 2001 (JP) ........................................ 2001-030290

(51) Int. Cl.[7] ................................................ G05B 5/01
(52) U.S. Cl. ...................... 318/611; 318/612; 318/614; 318/615; 248/638; 702/56
(58) Field of Search ................................ 318/611, 614, 318/615; 218/638; 702/56

(56) References Cited

U.S. PATENT DOCUMENTS

| | | | |
|---|---|---|---|
| 5,633,720 A | * | 5/1997 | Takahashi .................... 356/401 |
| 5,721,477 A | * | 2/1998 | Sepehri et al. ............... 318/638 |
| 5,978,330 A | * | 11/1999 | Ikeda et al. ............... 369/44.28 |
| 6,140,791 A | * | 10/2000 | Zhang ........................ 318/632 |
| 6,213,443 B1 | * | 4/2001 | Wakui ........................ 248/550 |
| 6,286,644 B1 | * | 9/2001 | Wakui ........................ 188/378 |

FOREIGN PATENT DOCUMENTS

| | | |
|---|---|---|
| JP | 2000-284805 A | 10/2000 |
| JP | 2000-305629 A | 11/2000 |

OTHER PUBLICATIONS

Makoto Iwasaki, et al., "The Transactions of the Institute of Electrical Engineers of Japan", Dec. 20, 1996, vol. 117–C, No. 1, pp. 50 to 56.
Makoto Iwasaki, et al., "Materials for Workshop in The Institute of Electrical Engineers of Japan" IIC–96–17, pp. 75 to 84.

* cited by examiner

Primary Examiner—Rita Leykin
(74) Attorney, Agent, or Firm—Sughrue Mion, PLLC (57) ABSTRACT

To provide a vibration-damping positioning controller capable of effecting stable positioning operation within a short period of time.

The vibration-damping positioning controller has an integrator 6 for integrating a differential value of the target position command; a subtracter 7 which subtracts the position command from an output of the integrator 6, to thereby output a position command error; a stable prefilter 1 which receives a the differential value of the target position command and eliminates a frequency component identical with a vibration pole $\omega_0$ of the feedback control system 5; command fixing means 2 which receives an output from the stable prefilter 1 and the position command error, judges that the command is started when a differential value of the target position command has changed from zero to a non-zero value, judges that the command is ended when the differential value of the target position command has changed from a non-zero value to zero, outputs zero from the time the position command error has assumed zero after the command is ended until the next command is started, and in other cases produces an output of the stable prefilter 1 in an unmodified form; and a second integrator 4 which integrates an output from the command fixing means 2, to thereby output the position command.

2 Claims, 6 Drawing Sheets

GROUND

VIBRATION SUPPRESSION POSITIONING CONTROLLER

TECHNICAL FIELD

The invention relates to a positioning controller for performing positioning operation by driving load through use of a motor, and more particularly, to a technique for damping low-frequency vibration in a load or in a bed on which the load is to be disposed.

BACKGROUND ART

In pursuit of a demand for weight reduction and miniaturization of recent industrial machinery, the rigidity of a shaft used for connecting a motor with load and that of a bed on which a drive mechanism is to be disposed are becoming lower, and the natural frequency of a load system and that of the bed tend to decrease. In tandem with these tendencies, the performance of a servo control system and a response in the drive system also tend to be enhanced. In relation to the servo control system remaining under these circumstances, a problem of the load or the bed becoming susceptible to vibration is starting to become noticeable.

Figure 3:
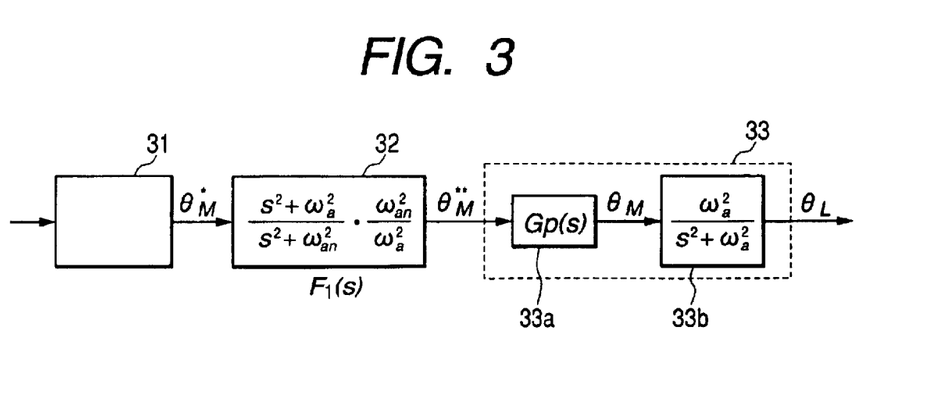
FIG. 3 is a block diagram showing the configuration of a related-art vibration-damping positioning controller.
Figure 5:
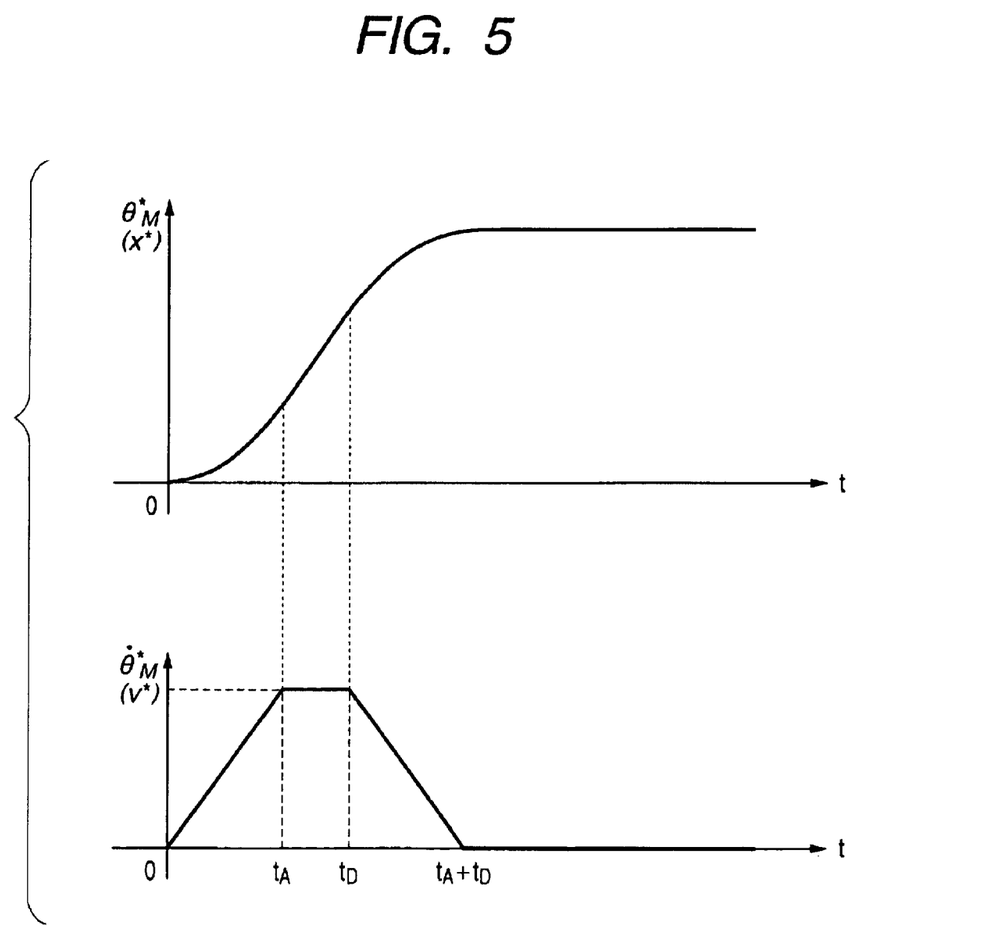
FIG. 5 is a view showing a time function pertaining to an S-shaped position command and an command speed pattern.

In order to dampen such vibration, a servo controller, such as that shown in FIG. 3, described in "Materials for Workshop in The Institute of Electrical Engineers of Japan" IIC-96-17, pp. 75 to 84, has already been put forth. In the drawing, reference numeral 31 designates an S-shaped position command generator; 32 designates a metastable prefilter; 33 designates a semi-closed feedback position control system; 33a designates a transfer function from a position command of a feedback control system to the position of a motor; and 33b designates a transfer function from the position of the motor to the position of load. A natural vibration angular frequency of load in the feedback control system is $\omega_a$, which shows a case where a speed pattern $\theta^*_M$ of an S-shaped position command assumes a trapezoidal shape as shown in FIG. 5, wherein an acceleration time and a deceleration time are equal to each other. Here, $t_A$ denotes an acceleration/deceleration time; and ($t_D - t_A$) denotes a constant speed time.

When the servo controller has such a control system, a vibration pole $\omega_a$ of the feedback position control system 33 is canceled by a zero of a transfer function of the metastable pre-filter 32, wherein the transfer function is defined as $$F_1(S) = \frac{S^2 + \omega_a^2}{S^2 + \omega_{an}^2} \cdot \frac{\omega_{an}^2}{\omega_a^2}. \tag{1}$$

Dampening control is accomplished by setting $\omega_{an}$ so as to satisfy any term of Equation (2).

$$1-\cos \omega_{an} t_A = 0,\ 1-\cos \omega_{an} t_D = 0 \tag{2}$$

The related art presents the following problems.

Figure 6:
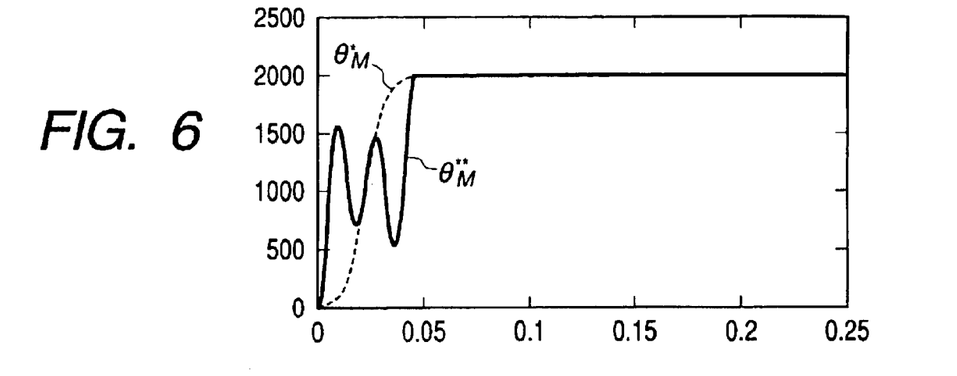
FIG. 6 is a view showing a time function of a related-art position command when $t_A$ is constant and the metastable prefilter is embodied in the form of a continuous system.

(1) When the acceleration/deceleration time and the constant speed time, both pertaining to the target position command $\theta^*_M$, are short, a position command $\theta^{**}_M$ of the feedback system becomes steep (see FIG. 6, and detailed descriptions will be provided later).

Figure 7:
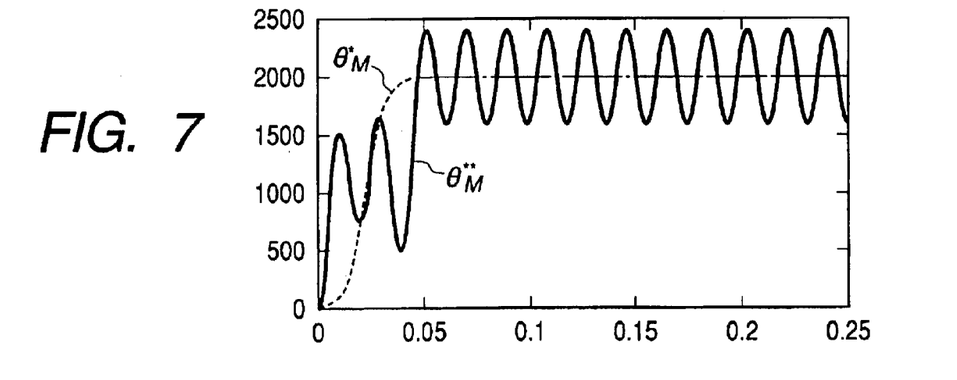
FIG. 7 is a view showing a time function of a related-art position command when $t_A$ has dropped by 5% and the metastable prefilter is embodied in the form of a continuous system.

(2) Equation (2) must be satisfied strictly. If Equation (2) is not satisfied, continuous vibrations develop. For instance, if the acceleration/deceleration time of the target position command $\theta^*_M$ has been nominally changed by 5%, the position command $\theta^{**}_M$ of the feedback system will continuously vibrate as shown in FIG. 7, which will be described later.

Figure 8:
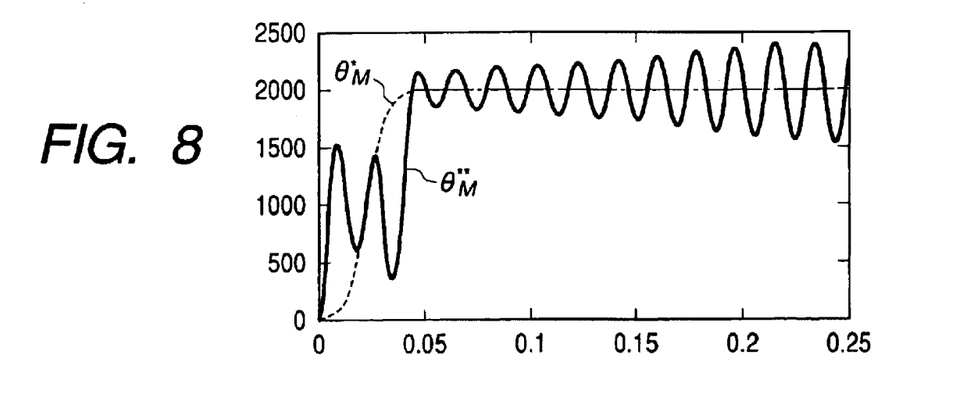
FIG. 8 is a view showing a time function of a related-art position command when $t_A$ is constant and the metastable prefilter is embodied in the form of a discrete system.

(3) If an attempt is made to implement the related-art metastable prefilter through use of computation means such as a CPU or the like, a critical stability pole of the metastable prefilter becomes unstable, for reasons of an error in a discrete approximations, which in turn makes the metastable prefilter unstable. For instance, even if a sampling time is nominally 100 μs, the position command $\theta^{**}_M$ of the feedback system becomes unstable as shown in FIG. 8 (i.e., the position command becomes divergent while vibrating).

When consideration is given to the problems of the related-art metastable prefilter, the true nature of all the problems resolves itself to a 0 attenuation term of the denominator of the filter. Simple application of a filter having an attenuation term to the metastable prefilter is usually conceivable as a solution. However, this solution ends in an increase in a delay time of the filter, thereby prolonging a positioning time. In the related-art, the attenuation term is considered to be set to zero for eliminating such a delay time. Therefore, following the conventional line of thought cannot produce the configuration of a prefilter "having high stability and involving a short positioning time."

DISCLOSURE OF THE INVENTION

In order to solve such a basic problem, the invention aims at providing a vibration-damping positioning controller which can fix a position command of a feedback control system to a target position by setting an output from a prefilter to zero when the position command of the feedback control system coincides with a target command, thereby enabling stable positioning operation within a short period of time.

A vibration-damping positioning controller according to an invention of claim 1 produces a position command when given a differential value of a target position command that changes in a predetermined pattern, and causes load to follow the position command by inputting the position command to the feedback control system, wherein the controller comprises: an integrator for integrating a differential value of the target position command; a subtracter which subtracts the position command from an output of the intergrator, to thereby output a position command error; a stable prefilter which receives a differential value of the target position command and eliminates a frequency component identical with a vibration pole $\omega_0$ of the feedback control system; command fixing means which receives an output from the stable prefilter and the position command error, judges that the command is started when a differential value of the target position command has changed from zero to a non-zero value, judges that the command is ended when the differential value of the target position command has changed from the non-zero value to zero, outputs zero from the time the position command error has assumed zero after the command is ended until the next command is started, and in other cases produces an output of the stable prefilter in an unmodified form; and a second integrator which integrates an output from the command fixing means, to thereby output the position command.

A vibration-damping positioning controller according to an invention of claim 2 produces a position command when given a target position command that changes in a predetermined pattern, and causes load to follow the position command by inputting the position command to the feedback control system, wherein the controller comprises: a differentiator for differentiating the target position command; a subtracter which subtracts the position command from the target position command, to thereby output a position command error; a stable prefilter which receives a differential value of the target position command serving as an output from the differentiator and eliminates a frequency component identical with a vibration pole $\omega_0$ of the feedback control system; command fixing means which receives an output from the stable prefilter and the position command error, judges that the command is started when a differential value of the target position command has changed from zero to a non-zero value, judges that the command is ended when the differential value of the target position command has changed from a non-zero value to zero, outputs zero from the time the position command error has assumed zero after the command is ended until the next command is started, and in other cases produces an output of the stable prefilter in an unmodified form; and a second integrator which integrates an output from the command fixing means, to there by output the position command.

By means of the foregoing configuration, even when low-frequency vibrations are present in load or a bed on which the load is to be placed, stable positioning can be performed within a short period of time.

As mentioned above, according to the invention, a target command signal is caused to pass through a stable prefilter. Hence, a natural vibration frequency component of machinery included in the target command signal is omitted. Further, the command signal that has passed through the stable prefilter is stable and smooth. Moreover, the command signal that has passed through the stable prefilter is caused to pass through the command fixing section. Hence, the final command signal that has been applied to the feedback control system reaches the target position immediately. Accordingly, there is yielded an advantage of the ability to obtain a stable positioning command whose command fixing time is short without inducing mechanical vibrations.

BEST MODES FOR CARRYING OUT THE INVENTION

Figure 1:
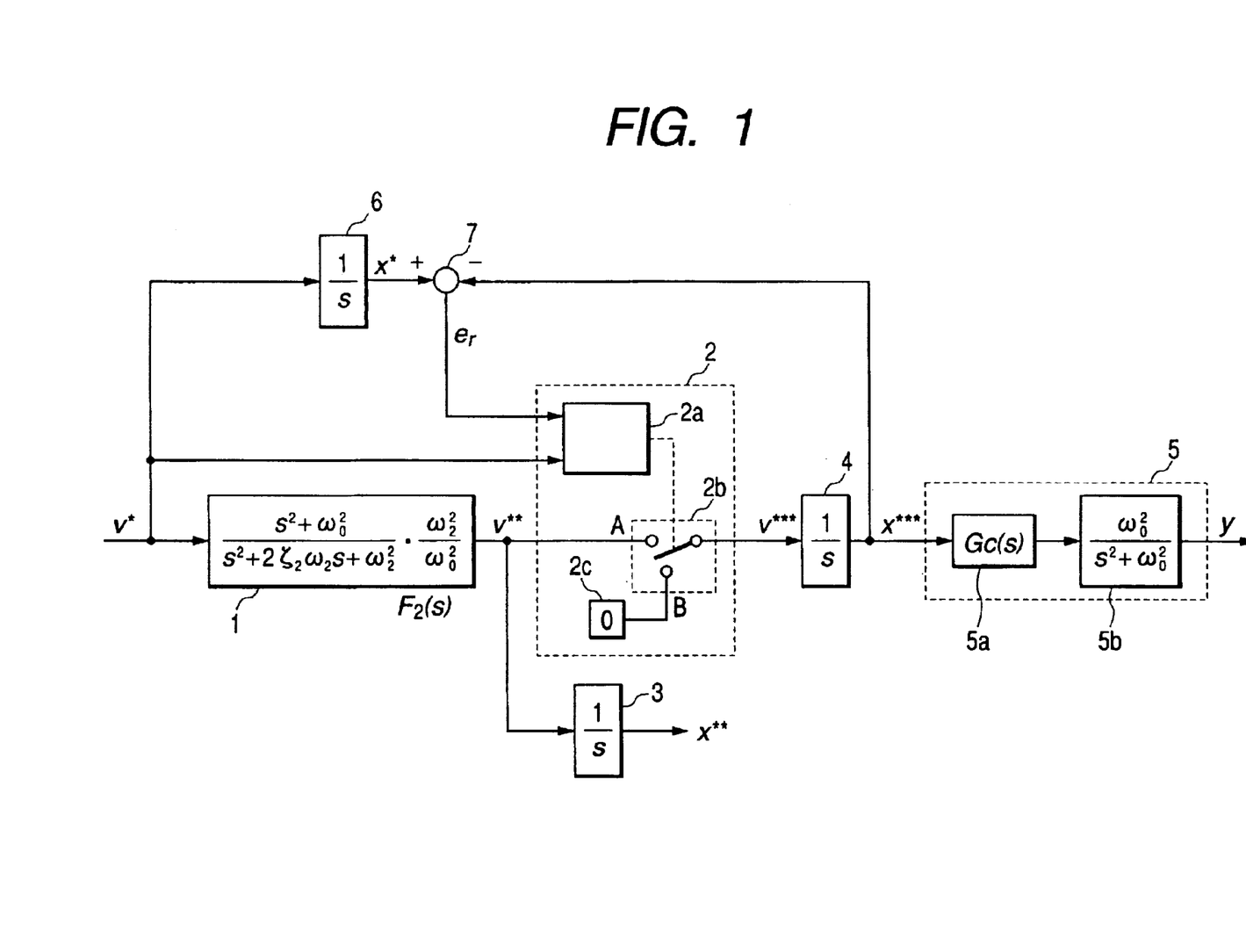
FIG. 1 is a block diagram showing a first embodiment of the invention.
Figure 2:
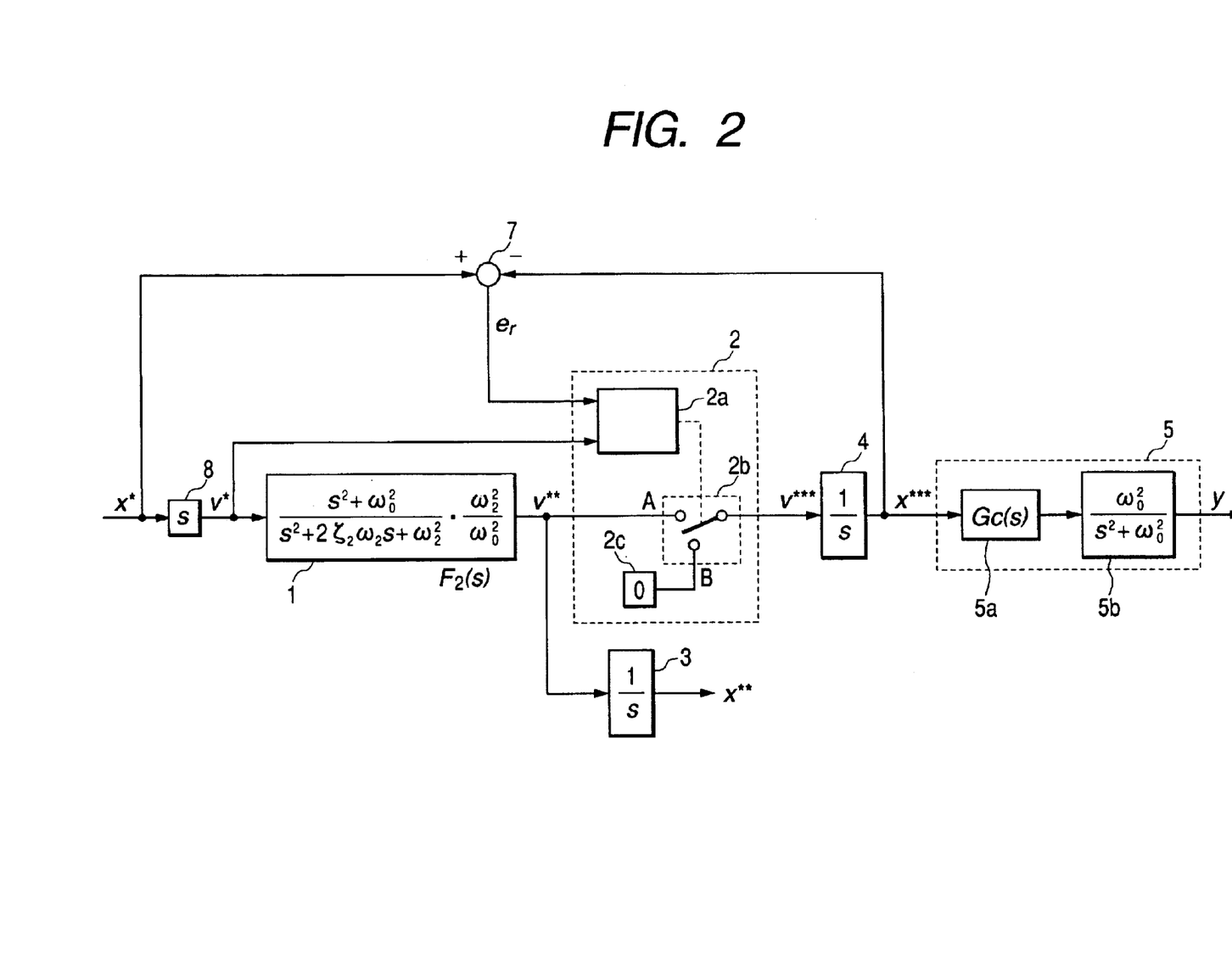
FIG. 2 is a block diagram showing a second embodiment of the invention.

Embodiments of the invention will now be described through use of the drawings. FIGS. 1 and 2 are block diagrams showing first and second embodiments of the invention; and FIG. 4 is a system block diagram to which the invention is applied.

Figure 4:
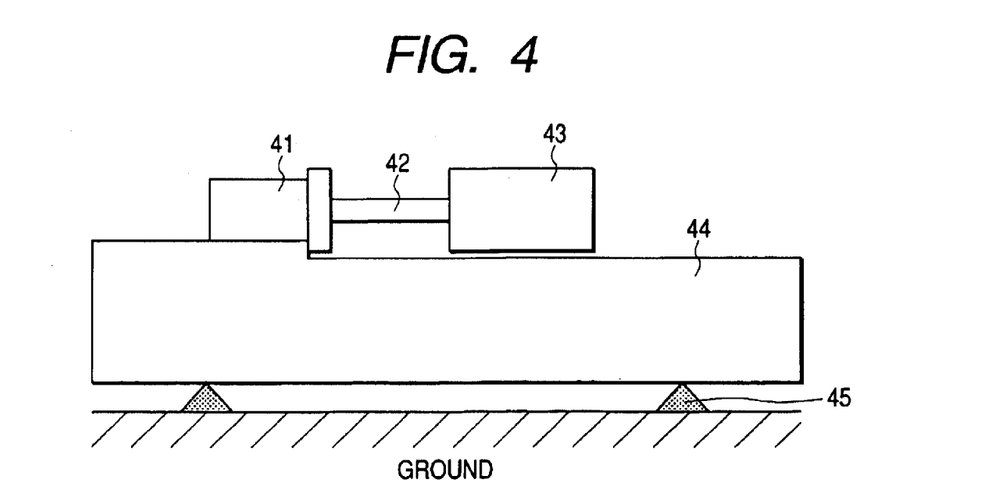
FIG. 4 is a system block diagram of the embodiment of the invention.

First, FIG. 4 is described, wherein reference numeral 41 designates a motor, 43 designates load, 42 designates a power transmission mechanism which connects the motor 41 to the load 43, to thereby transmit torque, 44 designates a bed on which these elements are mounted, and 45 designates support legs for supporting the bed 44. When the motor 41 drives the load 43 by way of the power transmission mechanism 42, the bed 44 receives reactive force of drive force of the motor 41. When the support legs 45 are of low rigidity, the bed 44 is susceptible to vibration. Further, when the motor drives the load at high accelerating/decelerating speed; particularly, when the cycle of drive force is close to the natural vibration cycle of the bed 44, the bed 44 becomes apt to vibrate.

In order to dampen such vibrations of the bed 44, the control systems of the first and second embodiments are configured as shown in FIGS. 1 and 2. In the drawings, reference numeral 5 designates a feedback control system; 5a designates a stability term of a transfer function from a position command x*** of the feedback control system 5 to a bed displacement "y"; and 5b designates an instability term of the transfer function. Here, $\omega_0$ denotes a natural vibration frequency of the bed 44.

In FIG. 1, when a differential value v* of a target position command is given, an integrator 6 integrates the differential value v* of the target position command, to thereby yield a target position command x*.

In FIG. 2, when the target position command x* is given, a differentiator 8 differentiates the target position command x*, thereby determining a differential value v* of the target position command.

In FIGS. 1 and 2, a subtracter 7 subtracts a position command x*** of the feedback control system 5 from the target position command x*, thereby determining a position command error $e_r$. The differential value v* of the target position command is input to a stable prefilter 1 having a transfer function defined by Equation (3).

$$F_2(s) = \frac{s^2 + \omega_0^2}{s^2 + 2\xi_2\omega_2 + \omega_2^2} \cdot \frac{\omega_2^2}{\omega_0^2} \quad \omega_2, \xi_2 > 0 \tag{3}$$

The thus-obtained signal v**, the position command error $e_r$, and the differential value v* of the target position command are input to an command fixing section 2.

Next, an command fixing section 2 judges the start and end of the target command on the basis of the differential value v* of the target position command. When the differential value v* changes from zero to a non-zero value, the command is judged to be started. In contrast, when the differential value v* changes from a non-zero value to zero, the command is judged to be ended. After the command is ended, the following operations are performed. Namely, a changeover switch is turned to position B, to thereby output 0 from the time the position command error $e_r$ has assumed 0 until the next command is started. In other cases, the changeover switch is turned to position A, whereupon the signal v is output. Specifically, before the position command of the feedback control system reaches the target position, the signal v that has passed through the stable prefilter 1 is output. After the position command of the feedback control system has reached the target position, zero is output. In the case of continuous feed in which a pattern shown in FIG. 5 is iterated, there is added processing for resetting the entire quantity of state of the stable prefilter 1 from the time the position command of the feedback control system has reached a target position until when the next feeding operation is started. As a result, since the stable prefilter 1 is started up in an initial state at all times, there is yielded an effect of the stable prefilter 1 operating normally even when an interval between the continuous patterns shown in FIG. 5 is short.

Finally, the output v* of the command fixing section 2 is integrated by the integrator 4, whereby the position command x* is obtained. As a result, the position command is input to the feedback control system 5.

As mentioned above, the natural vibration frequency $\omega_0$ component of the bed included in the differential value of the target position command is eliminated by causing the differential value of the target position command to pass through the stable prefilter 1. Therefore, the command signal that has passed through the stable prefilter 1 is stable and smooth, so that vibration of the bed is not induced. The command signal that has passed through the stable prefilter 1 is caused to pass through the command fixing section 2, whereupon the final command signal to be applied to the feedback control system can be caused to reach the target position immediately. In this way, a stable positioning command whose command fixing time is short can be obtained without inducing vibrations in the bed.

Simulations were carried out for the following three scenarios with regard to the advantages of the invention which will be yielded by the embodiment. The simulations will now be described.

Scenario 1) Time $t_A$ is constant, and the related-art metastable prefilter and the stable prefilter of the invention are embodied in the form of a continuous system.

Scenario 2) Time $t_A$ drops by 5%, and the related-art metastable prefilter and the stable prefilter of the invention are embodied in the form of a continuous system.

Scenario 3) Time $t_A$ is constant, and the related-art metastable prefilter and the stable prefilter of the invention are embodied in the form of a discrete system (a sample cycle Ts=100 μs).

Requirements common to the simulations include the target position command x* which assumes the patterns shown in FIG. 5, as in the case of $Q_M^*$; $t_A$=18.8 ms, $t_D$=27.2 ms, and the natural vibration frequency of the bed is $\omega_0$=12 Hz.

In relation to the related art, simulations were carried out with regard to the above three scenarios while parameters of the metastable prefilter $F_1(s)$ were set to $\omega_a=\omega_0$ and $\omega_{an}=2\pi/t_A$. Consequently, the resultantly-obtained time functions of the position commands are shown in FIGS. 6, 7, and 8.

Figure 9:
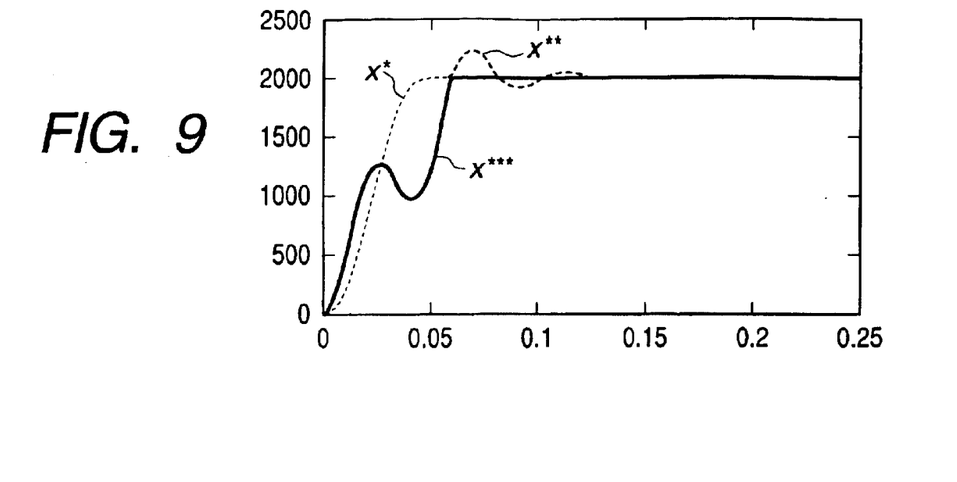
FIG. 9 is a view showing a time function of the position command of the invention when $t_A$ is constant and the metastable prefilter is embodied in the form of the continuous system.
Figure 10:
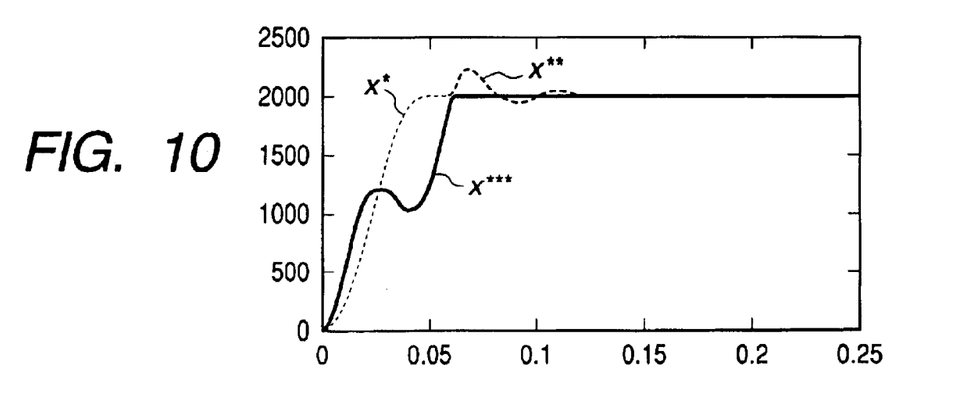
FIG. 10 is a view showing a time function of the position command of the invention when $t_A$ has dropped by 5% and a stable prefilter is embodied in the form of the continuous system.
Figure 11:
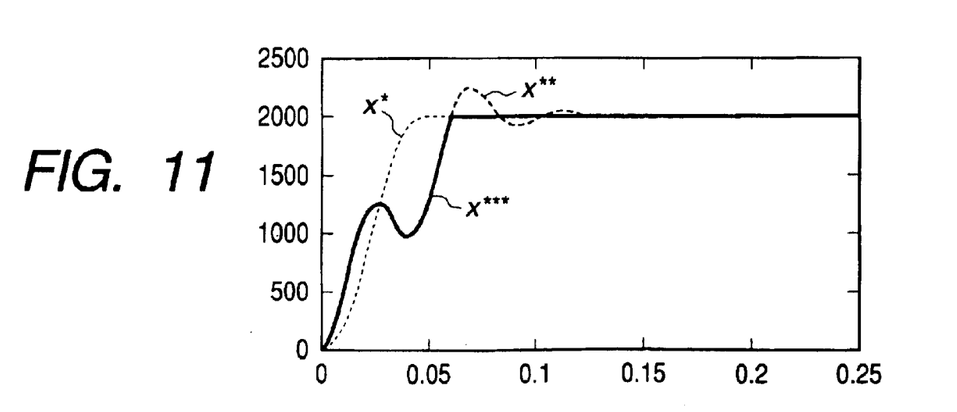
FIG. 11 is a view showing a time function of the position command when $t_A$ is constant and the stable prefilter is embodied in the form of the discrete system.

In relation to the case where the present invention is applied, simulations were carried out with regard to the above three scenarios while parameters of the metastable prefilter $F_2(s)$ were set to $\omega_2=2\omega_0$ and $\zeta_2=0.4$. The resultantly-obtained time functions of the position commands are shown in FIGS. 9, 10, and 11.

As can be seen from a comparison between FIGS. 6 through 8 and FIGS. 9 through 11, the position command $Q_M^{**}$ of the related-art feedback system 1) assumes a steep waveform;
2) continuously vibrates even when time $t_A$ is dropped slightly (by 5%); and
3) becomes unstable when the metastable prefilter is realized in the form of a discrete system.

A position command X*** of the feedback control system of the invention 1) is gentle;
2) has a substantially-constant waveform even when time $t_A$ has been decreased slightly (by 5%); and
3) has a waveform which does not change at all even when the stable prefilter is embodied in the form of a discrete system.

A time response is understood to be improved significantly as compared with the related-art technique.

Here, although the position command x that has passed through a stable prefilter $F_2(s)$ has been overshot, the position command x* of the feedback control system, which is an output from the command fixing section 2, is not overshot. Hence, the command fixing time has become extremely short.

INDUSTRIAL APPLICABILITY

According to the invention, since the target command signal has passed through the stable prefilter, a natural vibration frequency component of machinery included in a target command signal is eliminated. Moreover, the command signal that has passed through the stable prefilter has become stable and gently-sloped. Further, the command signal that has passed through the stable prefilter is caused to pass through an command fixing section. Accordingly, a final command signal added to a feedback control system reaches a target position immediately. Hence, there is yielded a great advantage of the ability to obtain a stable positioning command whose command fixing time is short without inducing mechanical vibrations.

What is claimed is:

1. A vibration-damping positioning controller which produces a position command when given a differential value of a target position command that changes in a predetermined pattern, and which causes load to follow the position command by inputting the position command to the feed back control system, the controller comprising:
    an integrator for integrating the differential value of the target position command;
    a subtracter which subtracts the position command from an output of the integrator, to thereby output a position command error;
    a stable prefilter which receives the differential value of the target position command and eliminates a frequency component identical with a vibration pole $\omega_0$ of the feedback control system;
    command fixing means which receives an output from the stable prefilter and the position command error, judges that the command is started when a differential value of the target position command has changed from zero to a non-zero value, judges that the command is ended when the differential value of the target position command has changed from a non-zero value to zero, outputs zero from the time the position command error has assumed zero after the command is ended until the next command is started, and in other cases produces an output of the stable prefilter in an unmodified form; and
    a second integrator which integrates an output from the command fixing means, to thereby output the position command.

2. A vibration-damping positioning controller which produces a position command when given a target position command that changes in a predetermined pattern, and which causes load to follow the position command by inputting the position command to the feedback control system, the controller comprising:

a differentiator for differentiating the target position command;

a subtracter which subtracts the position command from the target position command, to thereby output a position command error;

a stable prefilter which receives a differential value of the target position command serving as an output from the differentiator and eliminates a frequency component identical with a vibration pole $\omega_0$ of the feedback control system;

command fixing means which receives an output from the stable prefilter and the position command error, judges that the command is started when a differential value of the target position command has changed from zero to a non-zero value, judges that the command is ended when the differential value of the target position command has changed from a non-zero value to zero, outputs zero from the time the position command error has assumed zero after the command is ended until the next command is started, and in other cases produces an output of the stable prefilter in an unmodified form; and a second integrator which integrates an output from the command fixing means, to thereby output the position command.

* * * * *